(12) United States Patent
Ikezaki et al.

(10) Patent No.: US 12,118,718 B2
(45) Date of Patent: Oct. 15, 2024

(54) MEDICAL INFORMATION PROCESSING APPARATUS, MEDICAL INFORMATION PROCESSING METHOD, AND NON-TRANSITORY COMPUTER-READABLE MEDIUM

(71) Applicant: CANON MEDICAL SYSTEMS CORPORATION, Otawara (JP)

(72) Inventors: Aina Ikezaki, Utsunomiya (JP); Yasuko Fujisawa, Nasushiobara (JP); Chihiro Hattori, Nasushiobara (JP); Naotaka Sakashita, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 357 days.

(21) Appl. No.: 17/581,036

(22) Filed: Jan. 21, 2022

(65) Prior Publication Data

US 2022/0237774 A1 Jul. 28, 2022

(30) Foreign Application Priority Data

Jan. 27, 2021 (JP) .................................. 2021-011465

(51) Int. Cl.
*G06T 7/12* (2017.01)
*G06T 7/00* (2017.01)

(52) U.S. Cl.
CPC .. *G06T 7/0012* (2013.01); *G06T 2207/20081* (2013.01); *G06T 2207/30016* (2013.01)

(58) Field of Classification Search
CPC ......... G06T 7/0012; G06T 2207/20081; G06T 2207/30016
USPC .......................................................... 382/128
See application file for complete search history.

(56) References Cited

U.S. PATENT DOCUMENTS

| | | | | |
|---|---|---|---|---|
| 2012/0010474 | A1* | 1/2012 | Olsen ..................... | A61B 5/377 600/301 |
| 2017/0007165 | A1* | 1/2017 | Jain ......................... | A61B 5/165 |
| 2017/0049407 | A1* | 2/2017 | Ando .................... | A61N 5/0622 |
| 2018/0289266 | A1* | 10/2018 | Arai ........................ | A61B 5/165 |

FOREIGN PATENT DOCUMENTS

| | | |
|---|---|---|
| JP | 2015-116213 A | 6/2015 |
| JP | 2019-032767 A | 2/2019 |
| JP | 2019-527416 A | 9/2019 |
| WO | WO 2018/011615 A1 | 1/2018 |

* cited by examiner

*Primary Examiner* — Michael R Neff
(74) *Attorney, Agent, or Firm* — Oblon, McClelland, Maier & Neustadt, L.L.P.

(57) ABSTRACT

A medical information processing apparatus according to an embodiment includes a processing circuitry. The processing circuitry is configured to: obtain first nerve activity information indicating an activity of a nerve of a subject; estimate first feeling information indicating a feeling experienced by the subject on the basis of the first nerve activity information; and determine presentation information to enable an evaluator to experience the feeling of the subject, on the basis of the first feeling information.

8 Claims, 9 Drawing Sheets

MEDICAL INFORMATION PROCESSING APPARATUS, MEDICAL INFORMATION PROCESSING METHOD, AND NON-TRANSITORY COMPUTER-READABLE MEDIUM

CROSS-REFERENCE TO RELATED APPLICATIONS

This application is based upon and claims the benefit of priority from Japanese Patent Application No. 2021-011465, filed on Jan. 27, 2021; the entire contents of which are incorporated herein by reference.

FIELD

Embodiments described herein relate generally to a medical information processing apparatus, a medical information processing method, and a non-transitory computer-readable medium.

BACKGROUND

A problem to be solved by the embodiments described in the present disclosure and the drawings is to present information that makes it possible to experience a feeling of a subject. However, the problems to be solved by the embodiments described in the present disclosure and the drawings are not limited to the abovementioned problem. It is also possible to consider the problems corresponding to advantageous effects achieved by the configurations presented in the embodiments described below, as other problems.

DETAILED DESCRIPTION

Figure 1:
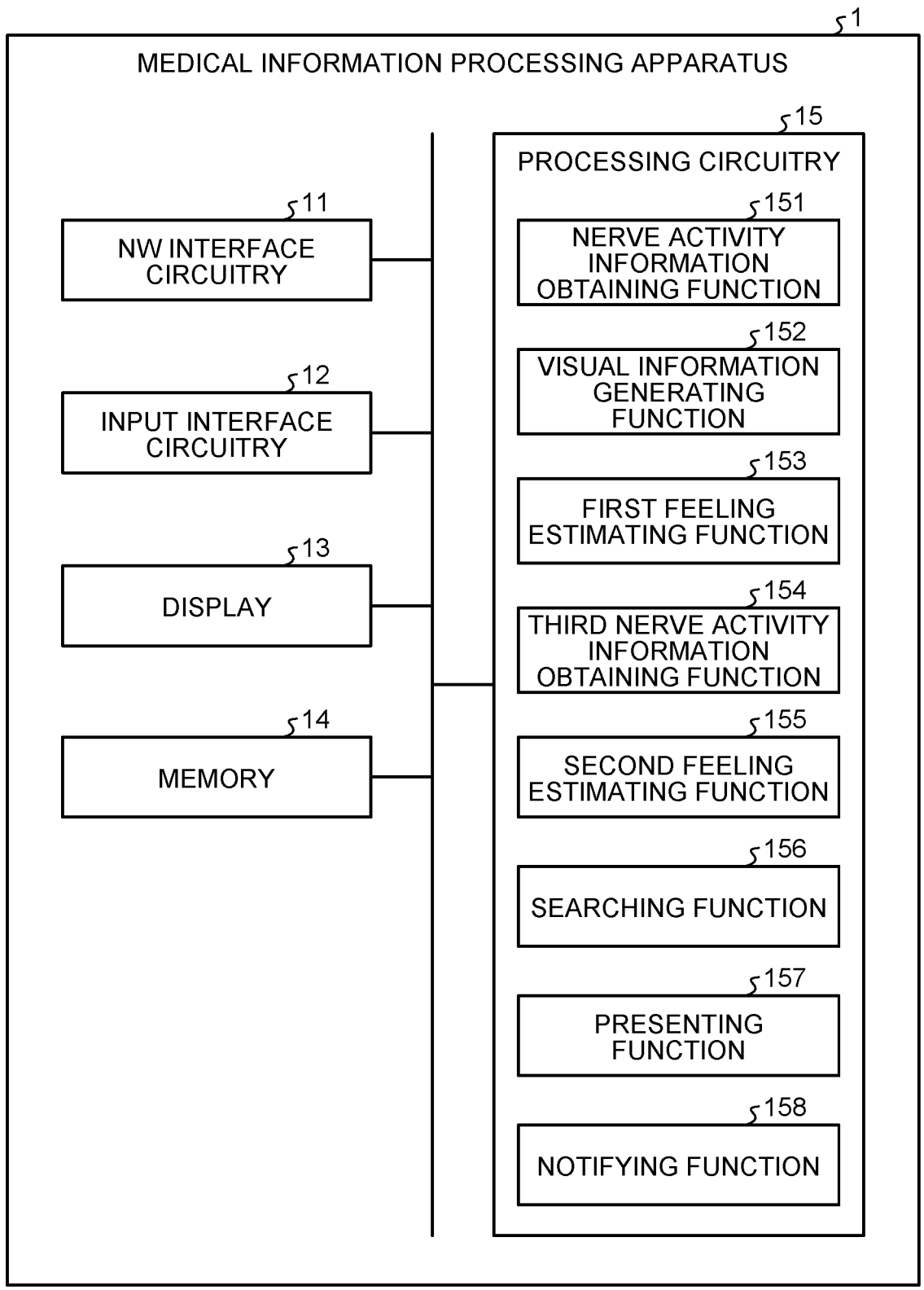
FIG. 1 is a block diagram illustrating an exemplary configuration of a medical information processing apparatus according to a first embodiment.

The following will describe a medical information processing apparatus, a medical information processing method, and a non-transitory computer-readable medium according to the present embodiments, with reference to the accompanying drawings. In the following embodiments, some of the elements referred to by using the same reference characters are assumed to perform the same operation, and duplicate explanations thereof will be omitted as appropriate.

First Embodiment

FIG. 1 is a block diagram illustrating an exemplary configuration of a medical information processing apparatus 1 according to a first embodiment. The medical information processing apparatus 1 is configured to obtain first nerve activity information and second nerve activity information of a subject such as a patient, from a measuring device that implements functional Magnetic Resonance Imaging (fMRI) or is realized with an electroencephalogram (EEG). The first nerve activity information is information having recorded electrical activities of the brain and nerves of the subject. For example, the first nerve activity information is brain activity information having recorded activities of the brain such as the frontal lobe relevant to feelings of the subject. The second nerve activity information is information being different from the first nerve activity information and having recorded electrical activities of the brain and nerves of the subject. For example, the second nerve activity information is brain activity information having recorded activities of the brain such as the visual cortex relevant to visual sensation of the subject. Further, instead of a device implementing functional Magnetic Resonance Imaging or an electroencephalogram (EEG), the measuring device may be realized by using other types of devices.

Further, on the basis of the second nerve activity information, the medical information processing apparatus 1 is configured to generate visual information indicating the visual sensation of the subject. In other words, the medical information processing apparatus 1 is configured to generate image data indicating the visual sensation experienced by the subject while in the state indicated by the second nerve activity information.

Further, the medical information processing apparatus 1 is configured to generate first feeling information by estimating the type of feeling and a degree of the feeling experienced by the subject, on the basis of the first nerve activity information. Examples of the type of feeling include, joy, adoration, terror, amazement, grief, disgust, rage, and vigilance. The degree of the feeling is expressed as one of the levels such as Level 1, Level 2, Level 3, and the like.

Further, the medical information processing apparatus 1 is configured to obtain, from a measuring device, third nerve activity information of an evaluator corresponding to a time when presentation information is presented. The presentation information is information presented to the evaluator so that the feeling of the subject can be experienced. For example, the presentation information is image data of the visual information or the like. Alternatively, the presentation information may be image data found in a search so that the feeling of the subject can be experienced. The evaluator is a person such as a medical doctor or a clinical psychologist who evaluates feelings of the subject. The third nerve activity information is information having recorded electrical activities of the brain and nerves of the evaluator. For example, the third nerve activity information is brain activity information having recorded activities of the brain such as the frontal lobe relevant to feelings of the evaluator.

Further, on the basis of the third nerve activity information, the medical information processing apparatus 1 is configured to generate second feeling information by estimating the type of feeling and a degree of the feeling experienced by the evaluator.

Further, the medical information processing apparatus 1 is configured to judge whether or not a degree of similarity between the first feeling information and the second feeling information is equal to or higher than a threshold value. When the degree of similarity is lower than the threshold value, the medical information processing apparatus 1 is configured to search for presentation information that makes the degree of similarity equal to or higher than the threshold value. In other words, the medical information processing apparatus 1 is configured to search for the presentation information that enables the evaluator to experience the feeling of the subject. For example, the medical information processing apparatus 1 may search for the presentation information such as image data that enables the evaluator to feel terror that is substantially equivalent to terror felt by the subject.

Further, when the degree of similarity between the first feeling information of the subject and the second feeling information of the evaluator becomes equal to or higher than the threshold value, the medical information processing apparatus 1 is configured to issue a notification. In this manner, the medical information processing apparatus 1 is configured to present the presentation information that makes it possible to experience the feeling of the subject.

Next, a configuration of the medical information processing apparatus 1 will be explained. The medical information processing apparatus 1 includes a Network (NW) interface circuitry 11, an input interface circuitry 12, a display 13, a memory 14, and a processing circuitry 15.

The NW interface circuitry 11 is connected to the processing circuitry 15 and is configured to control transfer of various types of data and communication performed with apparatuses and devices connected via a network. For example, the NW interface circuitry 11 is realized by using a network card, a network adaptor, a Network Interface Controller (NIC), or the like.

The input interface circuitry 12 is connected to the processing circuitry 15 and is configured to convert an input operation received from an operator (a medical worker) into an electrical signal and to output the electrical signal to the processing circuitry 15. More specifically, the input interface circuitry 12 is configured to convert the input operation received from the operator into the electrical signal and to output the electrical signal to the processing circuitry 15. For example, the input interface circuitry 12 is realized by using a trackball, a switch button, a mouse, a keyboard, a touchpad on which input operations can be performed by touching an operation surface thereof, a touch screen in which a display screen and a touchpad are integrally formed, a contactless input circuitry using an optical sensor, an audio input circuitry and/or the like. Further, in the present disclosure, the input interface circuitry 12 does not necessarily have to include physical operation component parts such as a mouse, a keyboard, and/or the like. For instance, possible examples of the input interface circuitry 12 include an electrical signal processing circuitry configured to receive an electrical signal corresponding to an input operation from an external input device provided separately from the apparatus and to output the electrical signal to a controlling circuit.

The display 13 is connected to the processing circuitry 15 and to display various types of information and various types of image data output from the processing circuitry 15. For example, the display 13 is realized by using a liquid crystal display device, a Cathode Ray Tube (CRT) display device, an organic Electroluminescence (EL) display device, a plasma display device, a touch panel, or the like.

The memory 14 is connected to the processing circuitry 15 and is configured to store therein various types of data. Further, the memory 14 is configured to store therein various types of programs that are read and executed by the processing circuitry 15 to realize various types of functions. For example, the memory 14 is realized by using a semiconductor memory element such as a Random Access Memory (RAM) or a flash memory, or a hard disk, an optical disk, or the like.

The processing circuitry 15 is configured to control operations of the entirety of the medical information processing apparatus 1. As for the processing circuitry 15, for example, processing functions implemented by a nerve activity information obtaining function 151, a visual information generating function 152, a first feeling estimating function 153, a third nerve activity information obtaining function 154, a second feeling estimating function 155, a searching function 156, a presenting function 157, and a notifying function 158 are stored in the memory 14 in the form of computer-executable programs. The processing circuitry 15 is a processor configured to realize the functions corresponding to the programs by reading and executing the programs from the memory 14. In other words, the processing circuitry 15 that has read the programs has the functions illustrated within the processing circuitry 15 in FIG. 1. For example, the memory 14 is an example of a storage medium that is a non-transitory computer-readable medium and includes instructions which a computer is caused to execute.

With reference to FIG. 1, the example was explained in which the single processer realizes the nerve activity information obtaining function 151, the visual information generating function 152, the first feeling estimating function 153, the third nerve activity information obtaining function 154, the second feeling estimating function 155, the searching function 156, the presenting function 157, and the notifying function 158; however, it is also acceptable to structure the processing circuitry 15 by combining together a plurality of independent processors, so that the functions are realized as a result of the processors executing the programs. Further, although the example was explained with reference to FIG. 1 in which the single storage circuitry (e.g., the memory 14) stores therein the programs corresponding to the processing functions, it is also acceptable to arrange a plurality of storage circuits in a distributed manner, so that the processing circuitry 15 reads a corresponding program from each of the individual storage circuits.

The term "processor" used in the above explanations denotes, for example, a Central Processing Unit (CPU), a Graphical Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). One or more processors are configured to realize the functions by reading and executing the programs saved in the memory 14. Further, instead of saving the programs in the memory 14, it is also acceptable to directly incorporate the programs into the circuits of the one or more processors. In that situation, the one or more processors realize the functions by reading and executing the programs incorporated in the circuits thereof.

The nerve activity information obtaining function 151 is configured to obtain the first nerve activity information indicating the activities of the nerves of the subject. Further, the nerve activity information obtaining function 151 is configured to obtain the second nerve activity information indicating the activities of the nerves relevant to the visual sensation of the subject. The nerve activity information obtaining function 151 is an example of an obtaining unit. More specifically, the nerve activity information obtaining function 151 is configured to obtain the first nerve activity information and the second nerve activity information from the measuring device that implements functional magnetic resonance imaging or is realized with an electroencephalogram. Also, the nerve activity information obtaining function 151 may obtain the first nerve activity information and the second nerve activity information of a designated part of the subject. For example, the nerve activity information obtaining function 151 may obtain the first nerve activity information of the frontal lobe in the brain of the subject. Further, the nerve activity information obtaining function 151 may obtain the second nerve activity information of the visual cortex in the brain of the subject.

The visual information generating function 152 is configured to generate visual information reproducing visual sensation experienced by the subject while in the state indicated by the first nerve activity information. The visual information is image data reproducing the visual sensation of the subject.

Figure 2:
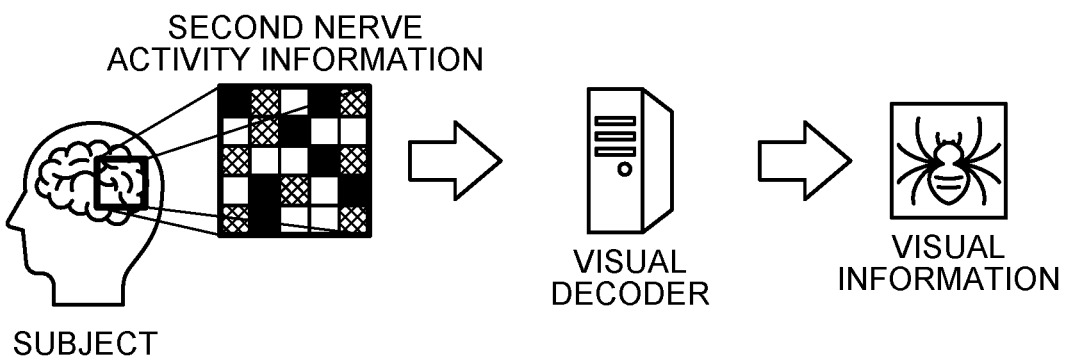
FIG. 2 is an explanatory drawing for explaining an overview of a visual decoder.

More specifically, the visual information generating function 152 is configured to generate the visual information from the second nerve activity information by using a visual decoder. In other words, the visual information generating function 152 is configured to generate the image data on the basis of the visual decoder that has learned, through machine learning, a correspondence relationship between the second nerve activity information indicating activities of nerves relevant to visual sensation and image data. In relation to this, FIG. 2 an explanatory drawing for explaining an overview of the visual decoder. As illustrated in FIG. 2, when the second nerve activity information is input thereto, the visual decoder is configured to generate the visual information corresponding to the second nerve activity information.

For example, the visual decoder is realized by using a trained model generated through the machine learning. More specifically, the visual decoder is generated through supervised learning in which second nerve activity information is input as training data on the input side of the trained model, whereas visual information corresponding to the second nerve activity information is input as training data on the output side.

For example, the visual decoder is generated through the supervised learning in which second nerve activity information of the vision cortex is input as the training data on the input side, whereas image data viewed at the time of obtaining the second nerve activity information is input as the training data on the output side. Further, although it is possible to obtain the second nerve activity information serving as the training data used for generating the visual decoder from any person, it is desirable when the person is an able-bodied person having no mental disorder.

The first feeling estimating function 153 is configured to generate the first feeling information by estimating the feeling experienced by the subject, on the basis of the first nerve activity information. In other words, the first feeling estimating function 153 is configured to estimate the first feeling information indicating the feeling experienced by the subject, on the basis of the first nerve activity information. The first feeling estimating function 153 is an example of a first estimating unit. More specifically, the first feeling estimating function 153 is configured to estimate the first feeling information on the basis of a feeling decoder that has learned, through machine learning, a correspondence relationship between the first nerve activity information and the first feeling information. The first feeling information is information that indicating a feeling related to the five senses and degrees of the five senses of the subject.

Figure 3:
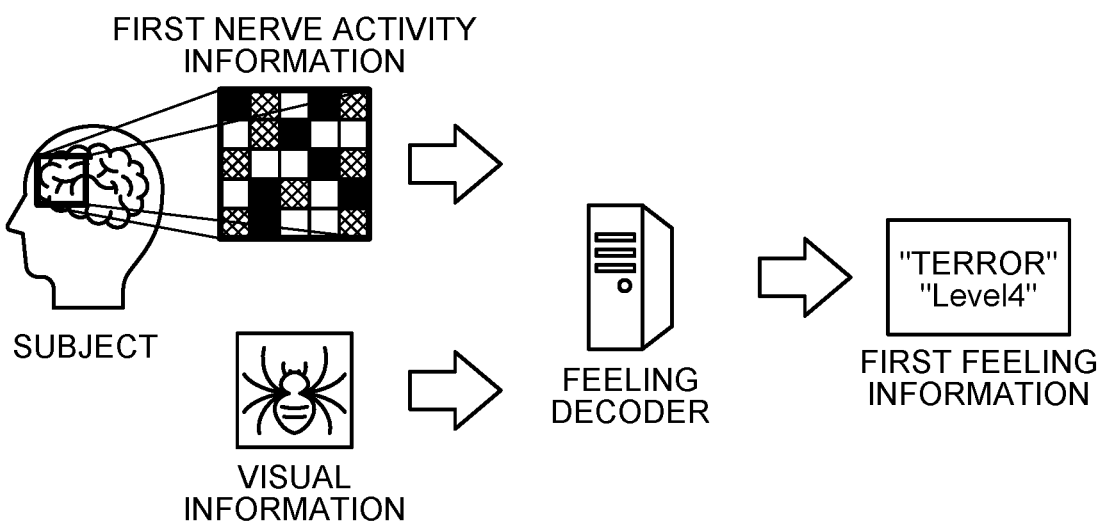
FIG. 3 is an explanatory drawing for explaining an overview of a feeling decoder of a first feeling estimating function.

In relation to the above, FIG. 3 is an explanatory drawing for explaining an overview of the feeling decoder of the first feeling estimating function 153. As illustrated in FIG. 3, when the first nerve activity information and the visual information corresponding to the first nerve activity information are input thereto, the feeling decoder is configured to generate the first feeling information corresponding to the first nerve activity information and the visual information. In other words, the feeling decoder is configured to estimate the first feeling information, on the basis of the first nerve activity information and the image data corresponding to the first nerve activity information. For example, the feeling decoder is realized by using a trained model generated through machine learning. More specifically, the feeling decoder is generated through supervised learning in which first nerve activity information and visual information are input as training data on the input side of the trained model, whereas first feeling information corresponding to the first nerve activity information and the visual information are input as training data on the output side.

The visual information is input to the feeling decoder illustrated in FIG. 3. However, it is acceptable even when no visual information is input to the feeling decoder. In other words, the feeling decoder may be configured, when the first nerve activity information is input thereto, to generate first feeling information corresponding to the first nerve activity information. In that situation, the feeling decoder is generated through supervised learning in which first nerve activity information is input as training data on the input side of the trained model, whereas first feeling information corresponding to the first nerve activity information is input as training data on the output side.

The third nerve activity information obtaining function 154 is configured to obtain the third nerve activity information indicating the activities of the nerves of the evaluator corresponding to the time when the presentation information is presented. More specifically, the third nerve activity information obtaining function 154 is configured to obtain the third nerve activity information from a measuring device that implements functional magnetic resonance imaging or is realized with an electroencephalogram. Further, the third nerve activity information obtaining function 154 may obtain the third nerve activity information of a designated part of the evaluator. For example, the third nerve activity information obtaining function 154 may obtain the third nerve activity information of the frontal lobe relevant to feelings of the evaluator.

The second feeling estimating function 155 is configured to generate the second feeling information by estimating the feeling experienced by the evaluator, on the basis of the third nerve activity information. More specifically, the second feeling estimating function 155 is configured to generate the second feeling information from the third nerve activity information by using a feeling decoder. The second feeling information is information that indicating a feeling related to the five senses and degrees of the five senses of the evaluator.

Figure 4:
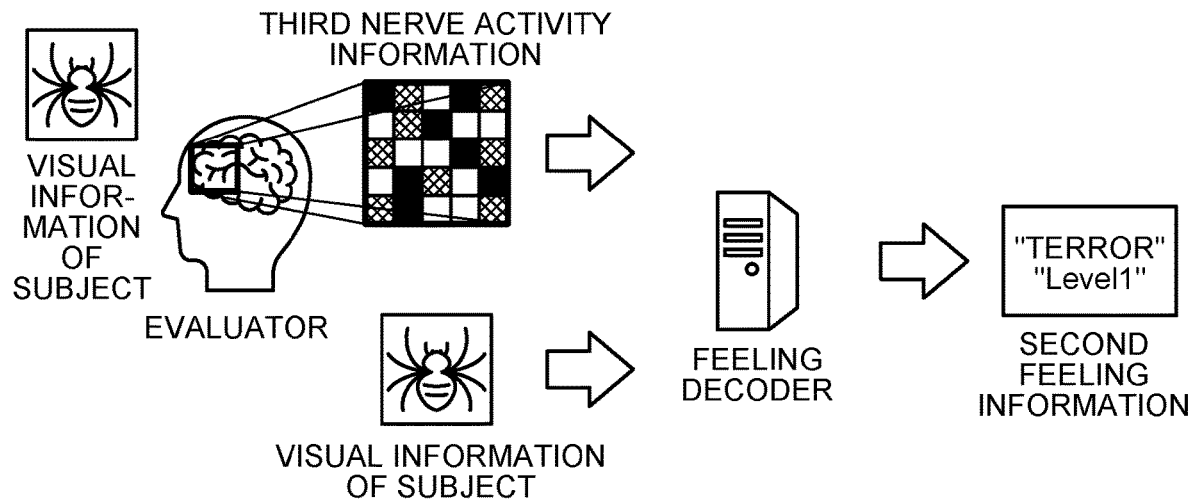
FIG. 4 is an explanatory drawing for explaining an overview of a feeling decoder of a second feeling estimating function.

FIG. 4 is an explanatory drawing for explaining an overview of the feeling decoder of the second feeling estimating function 155. As illustrated in FIG. 4, the evaluator views the visual information of the subject. In other words, the evaluator views the presentation information. When the third nerve activity information at the time of viewing the visual information or the presentation information and the visual information or the presentation information corresponding to the third nerve activity information are input thereto, the feeling decoder is configured to generate the second feeling information corresponding to the third nerve activity information and the visual information. In other words, the second feeling estimating function 155 is configured to estimate the second feeling information indicating the feeling experienced by the evaluator, on the basis of the third nerve activity information indicating the activities of the nerves of the evaluator and the image data generated by the visual decoder. Further, the second feeling estimating function 155 may use the same feeling decoder as the one used by the first feeling estimating function 153 or may use a feeling decoder that is exclusively generated.

The visual information is input to the feeling decoder illustrated in FIG. 4. However, similarly to the first feeling estimating function 153, it is acceptable even when no visual information is input to the feeling decoder. In other words, when the first feeling estimating function 153 has input the first nerve activity information and the visual information to the feeling decoder, the second feeling estimating function 155 inputs the first nerve activity information and the visual information to the feeling decoder. In contrast, when the first feeling estimating function 153 has input the first nerve activity information to the feeling decoder, the second feeling estimating function 155 inputs the first nerve activity information to the feeling decoder.

The searching function 156 is configured to search for the presentation information to enable the evaluator to experience the feeling of the subject. More specifically, when the degree of similarity between the first feeling information indicating the feeling of the subject and the second feeling information indicating the feeling of the evaluator is lower than the threshold value, the searching function 156 is configured to search for the presentation information that makes the degree of similarity between the feelings equal to or higher than the threshold value. Further, on the basis of the first feeling information, the searching function 156 is configured to determine the presentation information to enable the evaluator to experience the feeling of the subject. The searching function 156 is an example of a determining unit.

For example, the searching function 156 is configured to calculate the degree of similarity between the first feeling information and the second feeling information. The searching function 156 is configured to calculate a degree of similarity between the type of feeling of the first feeling information and the type of feeling of the second feeling information. Further, the searching function 156 is configured to calculate a degree of similarity between the degree of the feeling indicated by the first feeling information and the degree of the feeling indicated by the second feeling information. As a result, the searching function 156 calculates the degree of similarity between the feelings. In other words, the searching function 156 is configured to determine the presentation information for the evaluator on the basis of the first feeling information of the subject and the second feeling information of the evaluator. In this situation, the first feeling information and the second feeling information are generated from the first nerve activity information and from the third nerve activity information, respectively. Accordingly, instead of from the first feeling information and the second feeling information, the searching function 156 may calculate a degree of similarity from the first nerve activity information and the third nerve activity information. Further, the searching function 156 may calculate a degree of similarity between the feelings by using other methods. In other words, the searching function 156 is configured to determine the presentation information so that the degree of similarity between the first nerve activity information of the subject and the third nerve activity information of the evaluator is equal to or higher than the threshold value.

Next, a method for searching for the presentation information will be explained. Upon viewing the image data represented by the visual information, different evaluators experience different feelings depending on temperaments and cultural backgrounds thereof. For example, upon viewing of image data depicting a spider, feelings experienced by the evaluators vary among the evaluators. For this reason, the searching function 156 is configured to repeatedly perform the process of searching for the presentation information that makes the degree of similarity between the feelings equal to or higher than the threshold value.

For example, the searching function 156 may use a natural language processing model that is configured, upon receipt of an input of a word representing a target of visual information and a word representing a type of emotion indicated by emotion information, to output a peripheral word. The peripheral word is a word having a meaning close to that of the input word. For example, the natural language processing model is generated through machine learning. The natural language processing model is a natural language processing algorithm such as "Word2Vec". The natural language processing model is configured to learn a multi-dimensional vector space that properly expresses semantic relationships among words. The semantic closeness between words is expressed as a distance between corresponding word vectors. When the natural language processing model has output the peripheral word, the searching function 156 is configured to construct a vector space having vectors of the words that were input and output.

Figure 5:
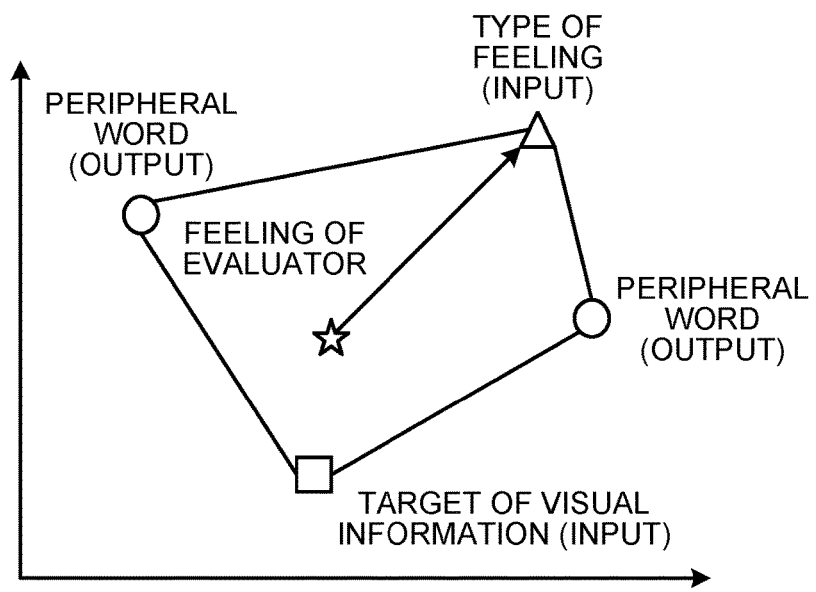
FIG. 5 is a diagram illustrating an example of a vector space having vectors of input and output words.

FIG. 5 is a diagram illustrating an example of the vector space having the vectors of the words that were input and output. The vector space in FIG. 5 depicts a situation in which two peripheral words were output from the natural language processing model. When having constructed the vector space, the searching function 156 is configured to set the feeling of the evaluator in the vector space. For example, the searching function 156 sets the feeling of the evaluator in a position within the vector space that corresponds to the type of emotion and the meaning of the degree of the emotion indicated by the second feeling information.

In the vector space, the searching function 156 is configured to set a goal position in which the degree of similarity between the emotions of the subject and the evaluator is estimated to be equal to or higher than the threshold value. Further, by conducting a search in the vector space, the searching function 156 is configured to specify a word in the goal position. For example, in the vector space, the searching function 156 searches for a word that minimizes a cost function. After that, the searching function 156 is configured to output presentation information specified by the word found in the search. In other words, the searching function 156 is configured to output image data containing the target representing the word.

Further, by using the word vectors, the natural language processing model is also capable of performing virtual addition and subtraction on words, such as "king−male+female=queen". For this reason, with respect to the words structuring the vector space that has already been constructed, the searching function 156 may perform calculations on the words, for the purpose of enabling the evaluator, in post-processing, to share the feeling information of the subject in a context suitable for the evaluator's temperament or cultural background. Accordingly, the searching function 156 is able to reconstruct the vector space. Furthermore, when a word vector relevant to a feeling (e.g., sound, smell) different from the visual sensation is output, the searching function 156 may append, as additional information, information about the feeling relevant to such a word vector, to the specific presentation information found in the search.

Every time the searching function 156 finds presentation information in a search, the presenting function 157 is configured to present the presentation information to the evaluator. More specifically, the presenting function 157 is configured to present the presentation information to the evaluator, by causing the display 13 to display the presentation information. In this situation, instead of using the display 13, the presenting function 157 may present the presentation information to the evaluator by using a device implementing the virtual space technology such as X Reality (XR). More specifically, the presentation information may be presented to the evaluator, by using a device implementing Augmented Reality (AR), Mixed Reality (MR), Substitutional Reality (SR), Virtual Reality (VR), or the like.

When the degree of similarity between the feeling of the subject and the feeling of the evaluator becomes equal to or higher than the threshold value, the notifying function 158 is configured to issue the notification. As a result, the evaluator is able to recognize that his/her feeling is substantially the same as the feeling of the subject.

Next, various types of processes performed by the medical information processing apparatus 1 will be explained.

Figure 6:
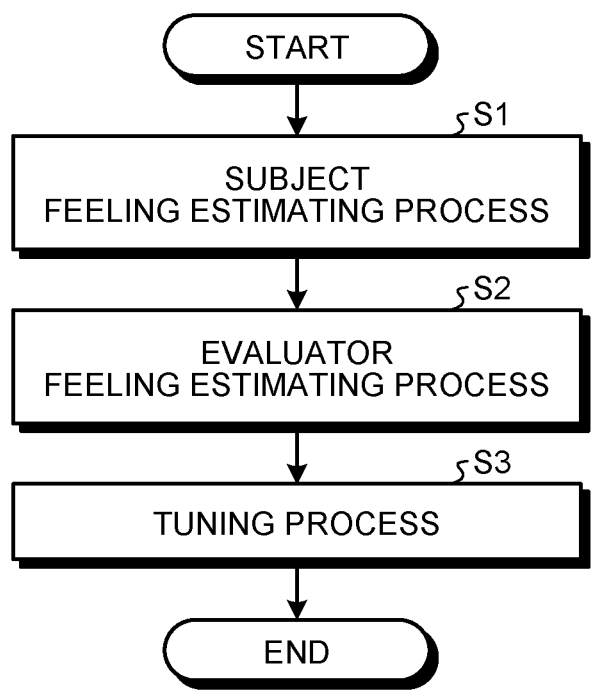
FIG. 6 is a flowchart illustrating an example of an examination process performed by the medical information processing apparatus according to the first embodiment.

FIG. 6 is a flowchart illustrating an example of an examination process performed by the medical information processing apparatus 1 according to the first embodiment.

Figure 7:
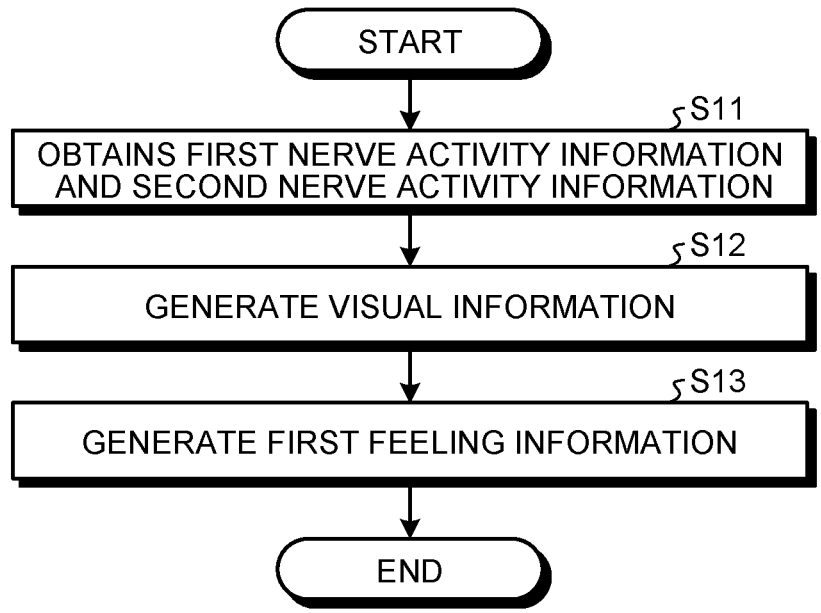
FIG. 7 is a flowchart illustrating an example of a subject feeling estimating process performed by the medical information processing apparatus according to the first embodiment.

The medical information processing apparatus 1 performs a subject feeling estimating process to estimate a feeling of the subject as illustrated in FIG. 7 (step S1).

Figure 8:
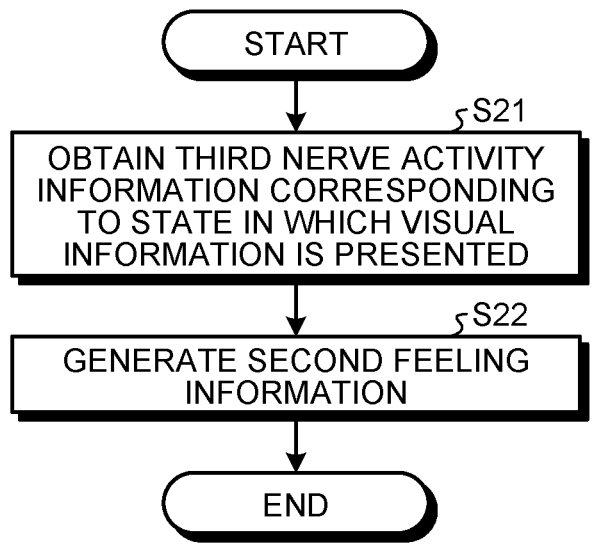
FIG. 8 is a flowchart illustrating an example of an evaluator feeling estimating process performed by the medical information processing apparatus according to the first embodiment.

The medical information processing apparatus 1 performs an evaluator feeling estimating process to estimate a feeling of the evaluator as illustrated in FIG. 8 (step S2).

Figure 9:
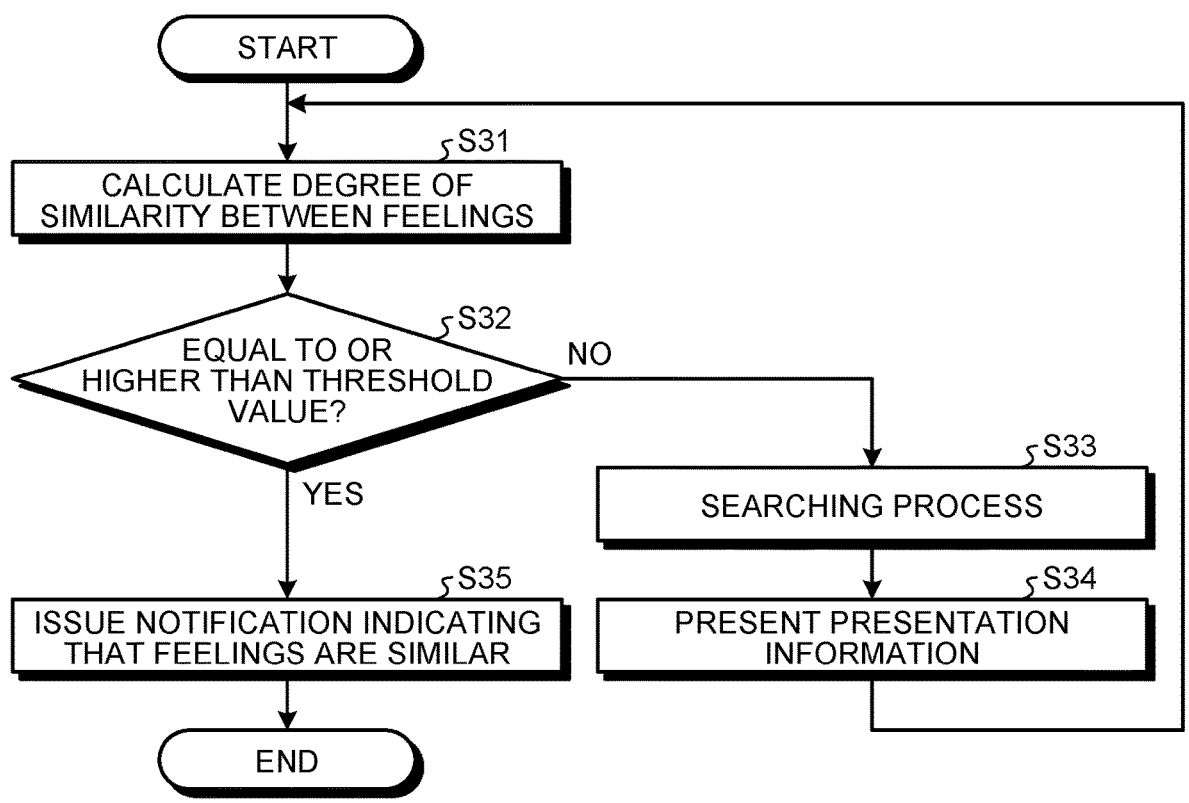
FIG. 9 is a flowchart illustrating an example of a tuning process performed by the medical information processing apparatus according to the first embodiment.

The medical information processing apparatus 1 performs a tuning process illustrated in FIG. 9 (step S3).

The medical information processing apparatus 1 thus ends the examination process.

FIG. 7 is a flowchart illustrating an example of the subject feeling estimating process performed by the medical information processing apparatus 1 according to the first embodiment.

The nerve activity information obtaining function 151 obtains the first nerve activity information and the second nerve activity information, from the measuring device that measures brain waves or the like of the subject (step S11).

The visual information generating function 152 generates the visual information from the second nerve activity information, by using the visual decoder (step S12).

The first feeling estimating function 153 generates the first feeling information, by estimating the feeling of the subject while using the feeling decoder (step S13).

The medical information processing apparatus 1 thus ends the subject feeling estimating process.

FIG. 8 is a flowchart illustrating an example of the evaluator feeling estimating process performed by the medical information processing apparatus 1 according to the first embodiment.

The third nerve activity information obtaining function 154 obtains the third nerve activity information from the measuring device that measures brain waves or the like of the evaluator who has viewed the presented visual information (step S21).

The second feeling estimating function 155 generates the second feeling information from the third nerve activity information by using the feeling decoder (step S22).

The medical information processing apparatus 1 thus ends the evaluator feeling estimating process.

FIG. 9 is a flowchart illustrating an example of the tuning process performed by the medical information processing apparatus 1 according to the first embodiment.

The searching function 156 calculates the degree of similarity between the feeling of the subject and the feeling of the evaluator (step S31). In other words, the searching function 156 calculates the degree of similarity between the first feeling information and the second feeling information.

The searching function 156 judges whether or not the degree of similarity between the feeling of the subject and the feeling of the evaluator is equal to or higher than the threshold value (step S32).

When the degree of similarity between the feelings is lower than the threshold value (step S32: No), the medical information processing apparatus 1 performs the searching process illustrated in FIG. 10 (step S33).

The presenting function 157 presents the presentation information obtained by performing the searching process (step S34). After that, the medical information processing apparatus 1 proceeds to step S31.

When the degree of similarity between the feelings is equal to or higher than the threshold value (step S32: Yes), the notifying function 158 issues a notification indicating that the feeling of the subject is similar to the feeling of the evaluator (step S35).

The medical information processing apparatus 1 thus ends the tuning process.

Figure 10:
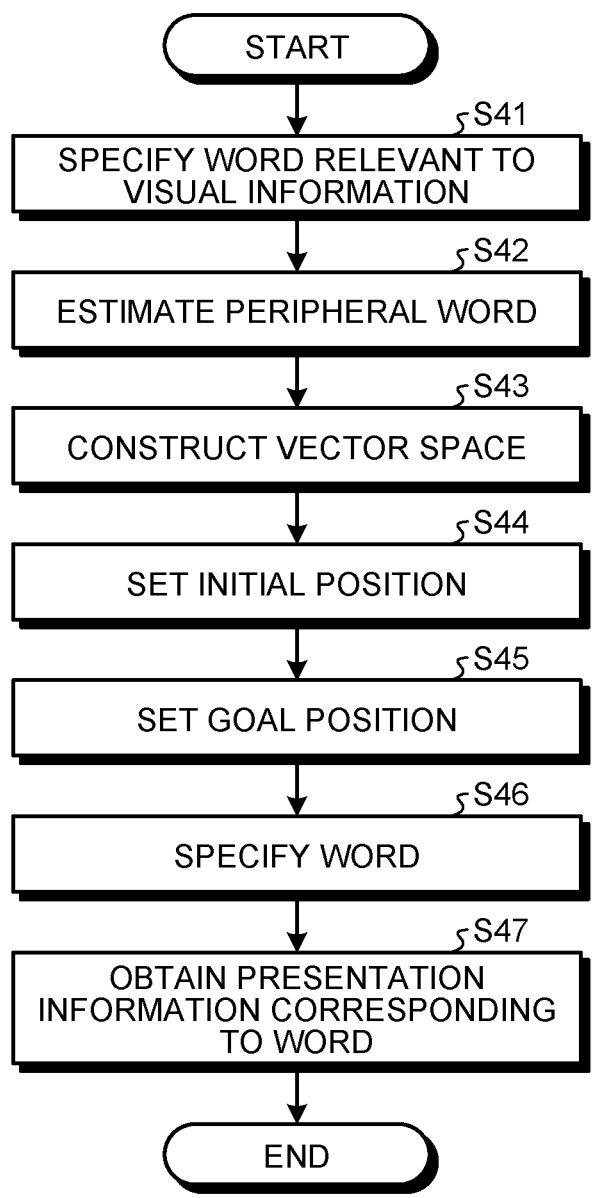
FIG. 10 is a flowchart illustrating an example of a searching process performed by the medical information processing apparatus according to the first embodiment.

FIG. 10 is a flowchart illustrating an example of the searching process performed by the medical information processing apparatus 1 according to the first embodiment.

The searching function 156 specifies a word relevant to the visual information (step S41). In this situation, when the degree of similarity between the feeling of the subject and the feeling of the evaluator to whom the visual information was presented is still not equal to or higher than the threshold value, the searching function 156 specifies a word relevant to the presentation information.

The searching function 156 estimates a peripheral word of the word representing the target indicated by the visual information or the presentation information and a word indicating the type of emotion indicated by the second emotion information of the evaluator (step S42). In other words, the searching function 156 inputs, to the natural language processing model, the word representing the target indicated by the image data and the word indicating the type of emotion indicated by the second emotion information of the evaluator. After that, the searching function 156 uses a word output from the natural language processing model, as the peripheral word.

The searching function 156 constructs a vector space having vectors of the words input to the natural language processing model and a vector of the peripheral word output from the natural language processing model (step S43).

The searching function 156 sets the feeling of the evaluator as an initial position in the vector space (step S44).

The searching function 156 sets, in the vector space, a goal position in which the degree of similarity between the emotions of the subject and the evaluator is estimated to be equal to or higher than the threshold value (step S45).

The searching function 156 specifies a word corresponding to the goal position, by conducting a search in the vector space (step S46).

The searching function 156 obtains presentation information corresponding to the specified word (step S47). In other words, the searching function 156 obtains image data containing the target representing the word.

The medical information processing apparatus 1 thus ends the searching process.

As explained above, the medical information processing apparatus 1 according to the first embodiment is configured to obtain the first nerve activity information indicating the activities of the nerves of the subject. Also, the medical information processing apparatus 1 is configured to estimate the first feeling information indicating the feeling experienced by the subject, on the basis of the first nerve activity information. Further, the medical information processing apparatus 1 is configured to determine the presentation information to enable the evaluator to experience the feeling of the subject, on the basis of the first feeling information. Accordingly, the evaluator is able to perform a diagnosis process or the like, while experiencing the feeling of the subject. In other words, the medical information processing apparatus 1 is capable of presenting the information that makes it possible to experience the feeling of the subject.

First Modification Example

The presentation information was described above as being image data; however, instead of being the image data, the presentation information may be auditory information.

In this situation, the visual information generating function 152 is configured to generate visual information to be presented to the evaluator. Further, when the degree of similarity between the feelings of the subject and the evaluator is still lower than the threshold value even after presenting the visual information, the searching function 156 is configured to search for image data. When the visual information generating function 152 has generated visual information or the searching function 156 has generated image data, the presenting function 157 is configured to obtain the auditory information corresponding to a target represented by the visual information or the image data.

For example, when the target represented by the visual information or the image data is a fire, the presenting function 157 is configured to obtain auditory information including sounds from an actual site having a fire. Further, the presenting function 157 is configured to present the obtained auditory information to the evaluator. In other words, the presenting function 157 is configured to cause a speaker or the like to output the auditory information.

In this situation, the presenting function 157 may obtain the auditory information by using any method. For example, the presenting function 157 may obtain the auditory information specified by the target represented by the visual information or the image data, from a database of auditory information. Alternatively, the presenting function 157 may obtain the auditory information, by using a trained model configured, upon receipt of an input of information indicating a target represented by the visual information or the image data, to output auditory information.

Alternatively, the medical information processing apparatus 1 may directly obtain the auditory information without the intervention of the visual information or the image data. For example, the medical information processing apparatus 1 may generate the auditory information on the basis of the first nerve activity information obtained from the auditory cortex.

Second Modification Example

The presentation information was described above as being image data; however, instead of being the image data, the presentation information may be olfactory information.

In this situation, the visual information generating function 152 is configured to generate visual information to be presented to the evaluator. Further, when the degree of similarity between the feelings of the subject and the evaluator is still lower than the threshold value even after presenting the visual information, the searching function 156 is configured to search for image data.

When the visual information generating function 152 has generated visual information or the searching function 156 has generated image data, the presenting function 157 is configured to obtain the olfactory information corresponding to a target represented by the visual information or the image data. When the target represented by the visual information or the image data is a fire, the presenting function 157 is configured to obtain olfactory information indicating a component of the smells from an actual site having a fire. Further, the presenting function 157 is configured to present the obtained olfactory information to the evaluator. In other words, the presenting function 157 causes a device configured to generate a smell of a designated component to output the smell of the component indicated by the olfactory information.

Further, the presenting function 157 may obtain the olfactory information by using any method. For example, the presenting function 157 may obtain the olfactory information specified by the target represented by the visual information or the image data, from a database of olfactory information. Alternatively, the presenting function 157 may obtain the olfactory information, by using a trained model configured, upon receipt of an input of information indicating a target represented by the visual information or the image data, to output olfactory information.

Alternatively, the medical information processing apparatus 1 may directly obtain the olfactory information without the intervention of the olfactory information or the image data. For example, the medical information processing apparatus 1 may generate the olfactory information on the basis of the first nerve activity information obtained from the olfactory cortex.

Second Embodiment

Figure 11:
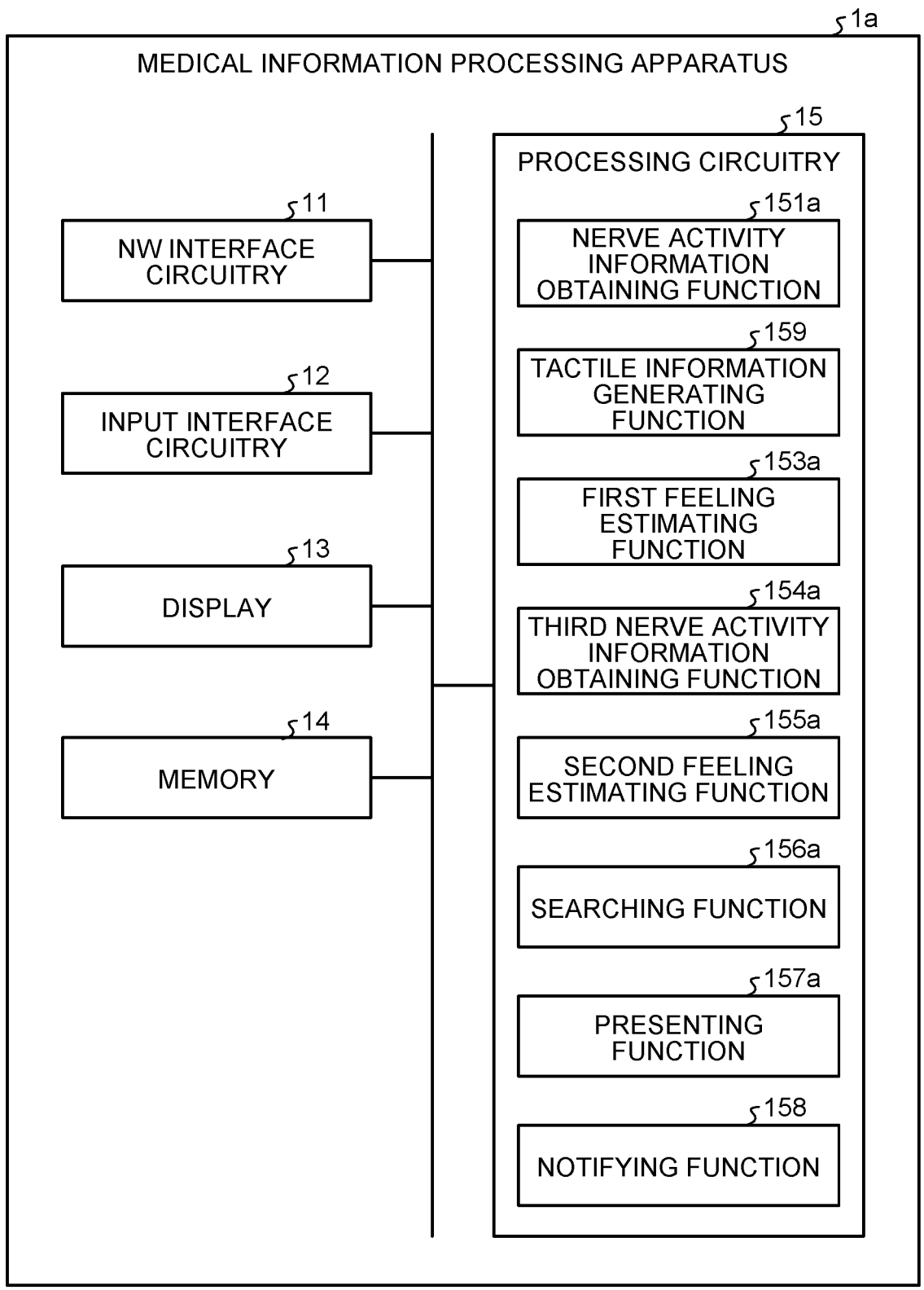
FIG. 11 is a block diagram illustrating an exemplary configuration of a medical information processing apparatus according to a second embodiment.

A medical information processing apparatus 1*a* according to a second embodiment is configured to present tactile information as the presentation information. FIG. 11 is a block diagram illustrating an exemplary configuration of the medical information processing apparatus 1a according to the second embodiment.

A nerve activity information obtaining function 151a is configured to obtain the second nerve activity information of the subject to whom a tactile stimulation is given by a tactile device such as an Electrical Muscle Stimulation (EMS) system. The second nerve activity information contains nerve electric potential (hereinafter, "nerve potential"; the same applies hereinafter) and muscle potential of the vertebrae or brain activity information such as a brain wave or brain potential of the cerebral cortex. In other words, the second nerve activity information is muscle potential information indicating the activity potential caused when the muscles of the subject contract.

A tactile information generating function 159 is configured to generate tactile information from the second nerve activity information. The tactile information is presentation information presented to the evaluator via a tactile device. For example, the tactile device is configured to give a touch stimulation to the evaluator, on the basis of the tactile information. On the basis of the second nerve activity information, the tactile information generating function 159 is configured to generate the tactile information including an intensity, a duration, and the like of the touch stimulation. For example, the tactile information generating function 159 is configured to use the difference between a reference line and a maximum amplitude value as the intensity of the touch stimulation. Further, when normalization is necessary, the tactile information generating function 159 is configured to make a correction by using an average amplitude value on a time scale during which no skin stimulation is given, i.e., without the tactile stimulation. Further, as the duration, the tactile information generating function 159 is configured to use a total of the time periods during which the amplitude value keeps exceeding the reference line by an amount equal to or higher than a threshold value during the measuring period. Further, the tactile information generating function 159 is configured to take noise above the reference line into consideration. When noise in the form of pulses intermittently continues multiple times, the tactile information generating function 159 is configured to calculate the number of times as an index. Further, the tactile information generating function 159 may calculate a sum of the products of the intensity and the duration of the touch stimulation, as an index indicating the intensity of the entire tactile sensation.

A first feeling estimating function 153a is configured to generate the first feeling information by estimating a feeling experienced by the subject, on the basis of the first nerve activity information obtained from the frontal lobe or the like of the patient. For example the first feeling estimating function 153a is configured to generate the first feeling information expressing the feeling experienced by the subject, by using an onomatopoeia. In other words, the first feeling information is information indicating the tactile sensation.

Figure 12:
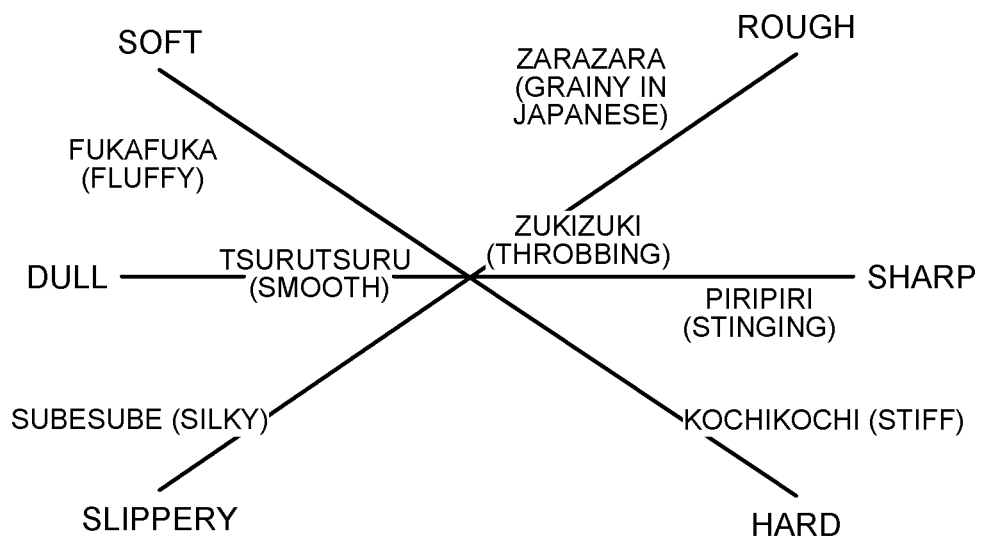
FIG. 12 is drawing illustrating an example of a two-dimensional distribution diagram of onomatopoeia.

In relation to the above, FIG. 12 is a drawing illustrating an example of a two-dimensional distribution diagram of onomatopoeia. Onomatopoeia is a collective term for words imitating sounds and words imitating manners such as "fukafuka ('fluffy' in Japanese)" and "tsurutsuru ('smooth' in Japanese)". Different individuals have different feeling impressions from onomatopoeia. In FIG. 12, in the two-dimensional distribution diagram indicating a correspondence relationship among tactile sensations, onomatopoeia such as "fukafuka('fluffy')" and "tsurutsuru ('smooth')" expressing impressions of an individual are set. In other words, the two-dimensional distribution diagram of onomatopoeia is generated for each subject and each evaluator. Accordingly, by projecting the feeling specified by the first nerve activity information onto the two-dimensional distribution diagram of the onomatopoeia, the first feeling estimating function 153a is able to specify an onomatopoeia suitable for the subject.

For example, the first feeling estimating function 153a is configured to project the feeling specified by the first nerve activity information with the use of the feeling decoder, onto the two-dimensional distribution diagram of the onomatopoeia. As a result, the first feeling estimating function 153a is able to specify an onomatopoeia suitable for the subject. After that, the first feeling estimating function 153a is configured to generate the first feeling information having the specified onomatopoeia.

A third nerve activity information obtaining function 154a is configured to obtain the third nerve activity information of the evaluator to whom the tactile stimulation is given by the tactile device. The tactile device is configured to operate on the basis of the tactile information of the subject. In other words, the tactile device is configured to output the tactile stimulation on the basis of the tactile information of the subject. Accordingly, the third nerve activity information obtaining function 154a is able to obtain the third nerve activity information of the evaluator corresponding to the time when the feeling experienced by the subject is given.

A second feeling estimating function 155a is configured to generate the second feeling information by estimating a feeling experienced by the evaluator, on the basis of the third nerve activity information. For example, the second feeling estimating function 155a is configured to project the feeling specified by the third nerve activity information with the use of the feeling decoder, onto the two-dimensional distribution diagram of the onomatopoeia. As a result, the second feeling estimating function 155a is able to specify an onomatopoeia suitable for the evaluator. After that, the second feeling estimating function 155a is configured to generate the second feeling information having the specified onomatopoeia.

A searching function 156a is configured to search for the presentation information to enable the evaluator to experience the feeling of the subject. More specifically, when the degree of similarity between the feeling of the subject and the feeling of the evaluator is lower than the threshold value, the searching function 156a is configured to search for the presentation information that makes the degree of similarity between the feelings equal to or higher than the threshold value. For example, the searching function 156a is configured to calculate a degree of similarity between the projection position of the feeling within the two-dimensional distribution diagram that is specified by the onomatopoeia corresponding to the first feeling information and the projection position of the feeling within the two-dimensional distribution diagram that is specified by the onomatopoeia corresponding to the second feeling information. Further, when the degree of similarity between the feelings is lower than the threshold value, the searching function 156a is configured to search for the presentation information that makes the degree of similarity between the feelings equal to or higher than the threshold value. In other words, the searching function 156a is configured to search for the tactile information to be presented to the evaluator via the tactile device.

Every time the searching function 156a finds presentation information in a search, a presenting function 157a is configured to present tactile information to the evaluator via the tactile device.

The notifying function 158 is configured to issue a notification when the degree of similarity between the feeling of the subject and the feeling of the evaluator becomes equal to or higher than the threshold value. As a result, the evaluator is able to recognize that, as for the tactile sensation, his/her feeling is substantially the same as the feeling of the subject.

As explained above, the medical information processing apparatus 1a according to the second embodiment is configured to obtain the first nerve activity information from the subject to whom the tactile stimulation is given. On the basis of the first nerve activity information, the medical information processing apparatus 1a is configured to estimate the first feeling information indicating the tactile sensation experienced by the subject. Further, on the basis of the first feeling information, the medical information processing apparatus 1a is configured to determine the presentation information to enable the evaluator to experience the tactile sensation of the subject. Accordingly, the evaluator is able to perform a diagnosis process or the like, while experiencing the tactile stimulation felt by the subject. In other words, the medical information processing apparatus 1a is capable of presenting the information that makes it possible to experience the feeling of the subject.

Further, instead of the tactile information, the presenting function 157a may present the onomatopoeia as the presentation information. The second feeling estimating function 155a may project the feeling of the subject onto the two-dimensional distribution diagram of the onomatopoeia of the evaluator, by using the first nerve activity information and the first feeling information. After that, the second feeling estimating function 155a may specify an onomatopoeia of the evaluator positioned closest to the projection position of the feeling of the subject in the two-dimensional distribution diagram of the onomatopoeia of the evaluator. As a result, the second feeling estimating function 155a is able to replace the onomatopoeia of the subject with the onomatopoeia of the evaluator. Further, the presenting function 157a may present the replacing onomatopoeia of the evaluator as the presentation information. In this situation also, the evaluator is able to simulatively experience the feeling of the subject.

Further, the onomatopoeia was explained above as an example of a method for quantifying the touch. However, instead of the onomatopoeia, other methods may be used for quantifying the touch. The touch may be quantified by using a Face Rating Scale (FRS) with which the intensity of a pain can be determined on the basis of a facial expression of an individual. Alternatively, the touch may be quantified on the basis of a pain detect sheet, which may be used in medical interviews of individuals. It is also acceptable to quantify the touch by using other methods.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information processing apparatus, comprising:
   processing circuitry configured to:
   obtain first nerve activity information indicating an activity of a particular nerve of a subject;
   generate first image data corresponding to the obtained first nerve activity information based on a visual decoder that has learned, through machine learning, a correspondence relationship between second nerve activity information indicating an activity of a nerve relevant to visual sensation and second image data corresponding to the second nerve activity information;
   estimate first feeling information indicating a feeling experienced by the subject based on a feeling decoder that has learned, through machine learning, a correspondence relationship between the first nerve activity information, the first image data corresponding to the first nerve activity information, and the first feeling information; and
   determine presentation information to enable an evaluator to experience the feeling of the subject, based on the first feeling information.

2. The medical information processing apparatus according to claim 1, wherein, based on the first nerve activity information, the processing circuitry is further configured to estimate the first feeling information that indicates the feeling experienced by the subject, the feeling experienced by the subject being related to five senses of the subject and degrees of the five senses.

3. The medical information processing apparatus according to claim 1, wherein the processing circuitry is further configured to obtain the first nerve activity information that indicates the activity of the particular nerve of the subject and is brain activity information.

4. The medical information processing apparatus according to claim 1, wherein the processing circuitry is further configured to:
   obtain the first nerve activity information that indicates the activity of the particular nerve of the subject and is muscle potential information, and
   based on the first nerve activity information, estimate the first feeling information that indicates the feeling experienced by the subject and indicates tactile sensation.

5. The medical information processing apparatus according to claim 1, wherein the processing circuitry is further configured to
   estimate second feeling information indicating a feeling experienced by the evaluator, based on third nerve activity information indicating an activity of a nerve of the evaluator and the image data generated by the visual decoder, and
   determine the presentation information for the evaluator, based on the first feeling information of the subject and the second feeling information of the evaluator.

6. The medical information processing apparatus according to claim 5, wherein the processing circuitry is further configured to determine the presentation information so that a degree of similarity between the first nerve activity information of the subject and the third nerve activity information of the evaluator is equal to or higher than a threshold value.

7. A medical information processing method, comprising:
   obtaining first nerve activity information indicating an activity of a particular nerve of a subject;
   generating first image data corresponding to the obtained first nerve activity information based on a visual decoder that has learned, through machine learning, a correspondence relationship between second nerve activity information indicating an activity of a nerve relevant to visual sensation and second image data corresponding to the second nerve activity information;

estimating first feeling information indicating a feeling experienced by the subject based on a feeling decoder that has learned, through machine learning, a correspondence relationship between the first nerve activity information, the first image data corresponding to the first nerve activity information, and the first feeling information; and determining presentation information to enable an evaluator to experience the feeling of the subject, based on the first feeling information.

8. A non-transitory computer-readable medium comprising instructions that cause a computer to execute:

obtaining first nerve activity information indicating an activity of a particular nerve of a subject;

generating first image data corresponding to the obtained first nerve activity information based on a visual decoder that has learned, through machine learning, a correspondence relationship between second nerve activity information indicating an activity of a nerve relevant to visual sensation and second image data corresponding to the second nerve activity information;

estimating first feeling information indicating a feeling experienced by the subject based on a feeling decoder that has learned, through machine learning, a correspondence relationship between the first nerve activity information, the first image data corresponding to the first nerve activity information, and the first feeling information; and determining presentation information to enable an evaluator to experience the feeling of the subject, based on the first feeling information.

\* \* \* \* \*